United States Patent
Rogers

(10) Patent No.: US 6,889,230 B1
(45) Date of Patent: May 3, 2005

(54) SYSTEM AND METHOD FOR PRESENTING SURVEY DATA OVER A NETWORK

(75) Inventor: William H. Rogers, Newton, MA (US)

(73) Assignee: Quality Data Management, Inc., Cleveland, OH (US)

( * ) Notice: Subject to any disclaimer, the term of this patent is extended or adjusted under 35 U.S.C. 154(b) by 141 days.

(21) Appl. No.: 09/992,126

(22) Filed: Nov. 5, 2001

Related U.S. Application Data

(60) Provisional application No. 60/245,753, filed on Nov. 3, 2000.

(51) Int. Cl.[7] .............................................. G06F 17/00
(52) U.S. Cl. .................................... 707/104.1; 707/102
(58) Field of Search ........................ 707/3, 102, 104.1; 715/501.1, 513; 725/24; 709/217, 203; 717/124

(56) References Cited

U.S. PATENT DOCUMENTS

| | | | |
|---|---|---|---|
| 6,301,586 B1 * | 10/2001 | Yang et al. .............. | 707/104.1 |
| 6,330,710 B1 * | 12/2001 | O'Neil et al. ................ | 717/100 |
| 6,381,604 B1 * | 4/2002 | Caughran et al. ............. | 707/10 |
| 6,442,714 B1 * | 8/2002 | Griffin et al. .................. | 714/46 |
| 6,564,259 B1 * | 5/2003 | Baber et al. ................. | 709/223 |
| 6,625,647 B1 * | 9/2003 | Barrick et al. ............. | 709/224 |
| 6,647,410 B1 * | 11/2003 | Scimone et al. ............ | 709/206 |
| 2001/0044809 A1 * | 11/2001 | Parasnis et al. ............. | 707/513 |
| 2002/0065926 A1 * | 5/2002 | Hackney et al. ............ | 709/231 |

* cited by examiner

*Primary Examiner*—Uyen Le
(74) *Attorney, Agent, or Firm*—Pearne & Gordon LLP

(57) ABSTRACT

A computer system and method for generating web pages for displaying formatted customer satisfaction display information and/or presentations on a user computer which may be located remotely and connected to the system by a computer network. The formatted customer satisfaction survey information enables a product or service provider to evaluate the quality of goods and/or services received based on database data obtained by performing surveys of customers, employees, and/or staff. This information can then be compared to normative information, national standards, or other available data. The system utilizes HTML templates, applets, and web servers to generate the web pages. The HTML template process also allows for generation of the HTML templates by programmers. The system and method can be utilized in a quality improvement program.

3 Claims, 4 Drawing Sheets

SYSTEM AND METHOD FOR PRESENTING SURVEY DATA OVER A NETWORK

This application claims the benefit of U.S. Provisional Application Ser. No. 60/245,753 filed on Nov. 3, 2000 and incorporated herein by reference.

BACKGROUND OF THE INVENTION

The present invention relates generally to a system and method for designing web page display software, and a system for automating the displaying of data to end users over Internets and Intranets. More particularly, the invention relates to a system and method for designing survey results display software, and a method and system for displaying, to a user, customer satisfaction survey information that enables a product or service provider to evaluate the quality of goods and/or services received based on ratings and reports obtained by performing surveys of customers, employees, and/or staff.

Conventional approaches for surveying consumers of products and services, such as health care services, generally use standard survey forms or questionnaires, whereby an agent calls or visits a survey participant and performs the survey. Alternatively, the participant may be mailed a survey form for completion. Traditionally, the data from such surveys are compiled into large books of cross-tabulations ("banner books") or are analyzed by special-purpose computer programs.

However, these methods of analyzing surveys and displaying their results are inefficient and untimely. Books of cross-tabulation are heavy and consume much paper, and finding a desired table requires considerable effort. The displays are usually numerical, and thus difficult for many readers to comprehend. Custom analyses require trained staff, who usually have a masters or doctorate degree. The production of banner books or custom analyses is a discrete task, which may be time-consuming and expensive.

It would be advantageous to automate the data display process to reduce the number of human beings utilized in the survey process, to reduce the costs, improve the efficiencies, and overcome the shortcomings of current techniques identified above. Modern computer and networking technologies provide potential solutions to these problems. It would also be useful to automate the process of designing the display of survey information, so that programmers with minimal programming experience can design useful and informative display charts, graphs, and reports with less effort and greater consistency than is typically found in programming environments today.

A software design system and method organized to limit the necessity of using experienced programmers to only those situations where advanced skills are necessary, thus reducing the cost of developing software by reducing the number of more experienced programmers, would be advantageous. Accordingly, it would be useful to separate tasks such that those that require less skill to implement are identified, because those tasks can utilize programmers with lower skill levels, and thus reduce labor costs. Further, a standardized format of the various software modules/components could ensure that the tasks can be completed efficiently and competently according to precise specifications. This standardization is able to increase the efficiency of the programmers similar to the way an assembly line increases the efficiency of a mechanical assembly operation, further reducing costs while simultaneously increasing the quality of the product because standardization allows for precise quality control.

Currently, there exist web servers, JAVA servlet engines, database engines that are standard commercial products that can be used for designing the required programs, and computer graphics libraries. However, the commercially available products would require much custom programming, and are typically larger and more complicated than necessary, and so they take longer to transmit and initialize than necessary. Further, developing custom applets would allow greater control over the appearance of the output displays. Writing servlets based on HTML pages similar to the Java Server Pages (JSP) development system would be useful. However, JSP is typically not capable of a separable design process using a programming team or HTML visual design tools, nor is it typically used with macro substitution. The JSP design process is typically substantially more complicated than the design process described herein (the SParser design process). Thus, new methods are necessary.

Improvements could be partially accomplished with available commercial products. The best of the alternatives would be application generators for databases, such as the IBM Informix Red Brick® Warehouse. The Survey Processing System Implementation differs from this type of product in focus and efficiency. An implementation that uses an Internet-based analysis system with tools for manipulating databases is needed, whereas competing products are just tools for making database queries. The difference is evident at both levels. At the user level, it would be useful to have an implementation that integrates data with a detailed description and classification of the data to guide the analysis path, whereas the users of commercial database products are left to understand on their own what the data pertain to and how they fit together.

At the system design level, a more flexible and efficient system than currently available would be useful. Existing systems such as Red Brick are capable of producing simple displays such as bar charts, for example, but they typically cannot produce control charts within the boundaries of Red Brick@, nor could they produce anything comparable to cross-concept integrated displays. Components that are enabled for interaction (e.g. the user can click on parts of the display to show extra information) would be beneficial, but the graphics in the Red Brick® system are not interactive. Database companies normally provide general application programming tools that permit basic access through server programming languages such as PERL or JAVA. The Survey Processing System Implementation provides the system developer with SParser tools that are written in Java.

An even less satisfactory alternative would be to design a system based on a combination of Microsoft® products, such as FrontPage® and Visual Basic® Script, or the newer ".net" platform of tools. This type of system does not incorporate the generality of the HTML templates based on the SParser-enabled macro programming, nor does it allow a sequenced development strategy. Indeed, the resulting systems are orders of magnitude more complicated yet less functional.

The previous state of the art of survey results display is inadequate for a real-time survey analysis program to be used for the purpose of quality improvement by medical personnel and their executives. Existing data analysis tools are not sufficiently embedded in the context of a survey—the content of the survey and the responses, the hierarchical relationships between survey questions, the relationships between survey questions and external data, and typically cannot incorporate multimedia such as the actual voice of the respondent. Existing survey analysis tools (such as the SAS product) are command-driven, not interactive, and are too complicated for the intended consumers of survey, who are not professional analysts. Further, these tools are not adequate for presenting information in a way the user, often uneducated in statistical analysis, can easily interpret.

Although web-based graphical display tools exist, they are often so complicated that they work slowly, if at all, on many users' browsers, and they are very difficult to program—relying on explicit system programming of all database access and relying on skilled programmers often in short supply. Almost all of the statistical graphics available on the web are prepackaged images—inflexible and not interactive. It would be useful to provide a software development environment and tools that mitigate some of the difficulties of programming complex statistical images in a web-based environment. This environment would utilize a set of procedures and development tools to facilitate the programming of statistical display software and report generators into a library of standard forms and programs. Further, it would also be useful to provide a platform that utilizes these standard forms and programs to generate the desired output utilizing a web-based networking system, allowing remote data transfer and retrieval, formatting the information in a manner useful to end users in implementing a quality improvement process.

SUMMARY OF THE INVENTION

The invention consists of a process and a toolkit for implementing statistical analysis on the web (the SParser module), together with a library of lightweight applets and simple hypertext documents and database structures. These have been brought together in a functioning survey analysis system.

In particular, the invention utilizes a method for generating a web page for display on a user computer, the primary steps of the method including:
- receiving a web page request for generating a display presentation from a user computer,
- executing a servlet corresponding to the received web page request;
- retrieving an HTML template corresponding to the executed servlet;
- interpreting the HTML template including the following steps:
  - retrieving retrieved data from a database according to the servlet execution;
  - executing commands referenced in the HTML template, said commands for generating a display web page utilizing the retrieved data;
- serving the display web page to the user computer for generating a display presentation on the user computer.

The system implements this process to provide a local or remote user with graphical displays, tables, and/or multimedia presentations of survey data for use, for example, in a quality improvement process.

The design process for generating the SParser module starts with one or two custom-written small components which are executed on client computers (commonly known as lightweight applets). These contain instructions to draw simple statistical displays, such as bar charts, based on specified parameters. The statistical display designer creates a simple hypertext document demonstrating how the lightweight component is to be used. For example, there is an applet to draw a histogram or vertical bar chart, another to draw a horizontal bar chart, another to draw a control chart, one to draw a comparative display element, one to organize an array of comparative displays, etc. The histogram is useful for conveying the general distribution of survey responses that are obtained from the Integrated Communication System, and whether there are enough negative responses to suggest something needs to be done. The control chart is useful for detecting sudden changes or trends in the data. The database programmer then adds an example of data that might be produced by a database query. For a histogram, these might be counts of data in cells and the labels for those cells. A general design programmer may then modify the hypertext layout to produce a pleasing overall appearance. This person may have a bachelors or masters degree and knows HTML and JavaScript. The design programmer has the benefit of being able to work with test data and actually see the results without concern for the database access issues. Finally, the database programmer completes the design process by adding the SParser instructions. This programmer may use visual design tools such as Macromedia DreamWeaver® or Microsoft Front Page®.

DETAILED DESCRIPTION OF THE INVENTION

The Survey Processing System And Method has two important aspects. The first is a system of data analysis and presentation over Internet or Intranets to end users of the system. The second is a core tool that makes developing and extending the system straightforward and efficient.

The Survey Processing System And Method can be utilized by an automated survey system, such as the Integrated Communication System [ICS], described in application Ser. No. 09/871,279 and incorporated herein by reference. The ICS provides a tool that can be used to automate the survey process to reduce the number of human beings utilized in the survey process, to increase the accuracy, reduce the costs, improve the efficiencies, and overcome the shortcomings of current techniques identified above. The ICS combined with the system and method disclosed herein can be implemented in a quality control program in a system such as disclosed in the Physician Office Viewpoint Survey System and Method [POVS] by McEachern, disclosed in co-pending application Ser. No. 10/008,027, incorporated by reference. All of these systems and methods can utilize a quality improvement process and display methodology disclosed in co-pending application Method And System For Presentation Of Survey And Report Data by Neilson, Ser. No. 10/011,014.

The system of data analysis discused in the above references and utilized herein, makes a unique use of metadata—data that describes what is being analyzed that is itself a part of the analysis. It also provides a unique simplicity, being implemented for a particular survey using database structures that may be created automatically from the survey script. The system advances the state of the art in terms of interactivity and breadth of the types of data analyzed.

The system as a whole utilizes a series of HTML templates that describe how a certain analytical display is produced. The templates and the template processor (described herein as the SParser application) bring together various aspects of the system—the data and the applets. Each template is a blueprint for obtaining the necessary metadata that describes that structure of other data, the other data themselves, and specific set of instructions for laying out a particular type of analytic graph or table, or presenting written or spoken survey response content, plus references to any specific applet or applets to assist the display process.

Figure 1:
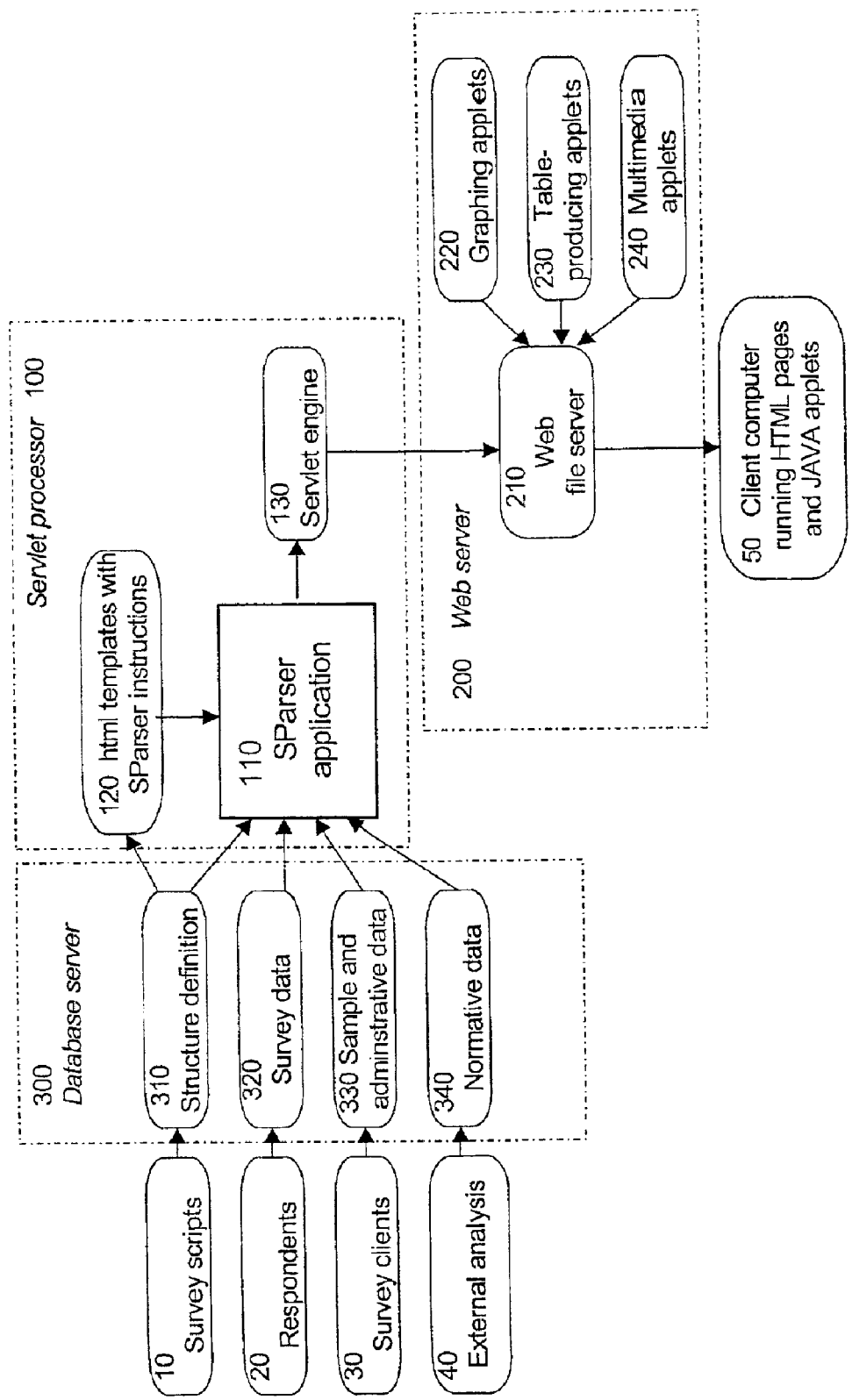
FIG. 1 is a block diagram showing the general system design and the overall flow of data through the survey analysis system.

The SParser application, the core tool of the data display aspect of the invention, is shown in FIG. 1. It is a computer program that reads hypertext templates and modifies them prior to sending them to the web server for display by the user's (client) browser. There is one template for each type of display in the system. The number of possible templates is unlimited-they are accessed through web pages or templates that are part of a particular implementation. Teams consisting of a statistical graphics expert, a web page designer, and a database programmer working independently can develop new templates using the development process outlined hereinbelow.

The core tool—based on the SParser application—is unique in its ability to divide the labor of a complex design process into three separable tasks that can be performed by distinct individuals with distinct skills who are available for reasonable salaries. The skilled developers—in statistical graphics, web-page design, and database programming—are available for reasonable salaries. The core tool advances the state of the art for visual design of web pages in a data-reliant framework, allowing less skilled computer programmers to develop relatively complicated outputs with relative ease. The system reduces the amount of work required to build or extend the data analysis system by providing common tools and utilizing commonplace programming skills.

FIG. 1 shows the major elements of the survey analysis system and the flow of data between them. Requests flow in the opposite direction (opposite the arrow direction). The request passes upward, through the web server 200, into the servlet processor 100, where it is handed off to the SParser application 110. The SParser application 110 reads an HTML template 120 which instructs it what to do. The most important function of the SParser application 110 is to obtain data from a database server 300—first, metadata 310 that elaborate to SParser 110 what to do (supplied by the system programmers using a translated survey script 10).

The data in the database server is obtained from a number of sources. Survey data 320 is supplied by survey respondents 20, which can be obtained by utilizing an automated survey system such as the ICS and POVS, referenced above. Administrative data 330 (such as the date of a medical visit that was the subject of a survey, for example) can be provided by the users organization, i.e., a survey client 30. External comparative data and/or normative data 340, can be obtained from surveys or survey clients, or by external analysis 40, such as government or academic studies, or other surveys, providing data similar or related to the particular client whose survey is the subject of analysis.

A request comes from a user query—initially, the user types in the name of the site in a web browser, for example, and from there the queries are generated by clicking the mouse on links or graphical elements displayed by the web browser, being operated by the user on a user computer. This computer can be remotely located from the display system, utilizing the Internet for network connectivity.

The request is passed up to the web file server 210, which turns it over to the servlet processor 100. The servlet processor 100 invokes a standard servlet (not shown) which immediately brings in the SParser 110. Based on the nature of the request, the SParser 110 finds the correct template 120 and reads it in. Templates are normally written in two parts. The first part looks up the metadata, and the second part looks up the data. The data, combined with HTML from the template, are passed back to the servlet processor 100, which in turn feeds them back to the web file server 210, which serves it to the client computer 50, together with any Java applets which may have been referenced (such as a graphing applet 220, a table producing applet 230, and/or a multimedia applet 240). Thus, the system can flexibly utilize stored data, templates, and applets to generated the desired charts, graphical displays, and reports to the user. The templates, applets, and data structure are all pre-defined by programmers utilizing the programming method described hereinbelow.

FIG. 1 shows a server for serving hypertext documents on the Internet (a "web server" 200), a server for handling custom data requests through JAVA programs (a "servlet engine" 130), a database server 300, a system for organizing complex data into a simple format for display ("the SParser application" 110), and database structures to support these components. The system also consists of computer programs for implementing various types of displays ("custom-written applets" 220, 230 & 240, for example), and hypertext [HTML] templates 120 for implementing the displays and connecting to the database server 300.

Small clusters of custom-written applets and hypertext pages specify the capabilities of the system as perceived by the client. For example, there is a custom written applet to draw histograms or bar charts with vertical bars and another applet to draw bar charts with horizontal bars. The hypertext documents specify where the histograms or bar charts are to be drawn, and they contain SParser 110 instructions for accessing the data and data descriptors. The SParser application 110 contains a macro language so that the exact data request for the histogram or bar chart is determined when the request for display is received from the end user. Since this system produces histograms or bar charts in general, it applies to any histogram or bar chart that the system designers may wish to produce.

There are many small groups of Java applets and hypertext templates. One set, described above, draws histograms and creates control charts. The same applets and other hypertext templates show several histograms or bar charts comparing results of different survey questions for one group of survey respondents or one question for several different groups of survey respondents. Another set produces control chart—displays of performance over time with methods to detect change. Other types of hypertext templates display verbal comments by survey respondents, correlations between survey components, allow the download of parts of the database, assist users in changing passwords, and allow selection of program options, navigation, etc.

Database tables that support the display process include a database of completed or partially-completed surveys, survey response data covering all persons on whom surveys were attempted, descriptions of survey data elements and derived variables, sample and/or administrative data, descriptions of data values, normative data values, and user password and preference data.

In FIG. 1, the request begins with an HTML query from the user (client) computer 50. This query is ordinarily generated when the user clicks on information transmitted from a previous interaction, such as by using hyperlinked documents. As described above, An HTML query is first processed by the web server 200, which determines from the HTML page, whether it should serve a static web page, or pass the request to the servlet engine 130.

The servlet engine 130 then loads a tiny servlet which immediately invokes the SParser 110 system together with a cache of data pertinent to this particular user, such as the identity of the user and restrictions on the data that may be in force. The SParser 110 performs some housekeeping, the system reads the HTML template page and transmits it back to the web server 200 using the logic of the servlet engine 130 until the web server 200 finds a set of instructions meant for it. When it finds SParser 110 instructions, the SParser 110 follows those instructions to locate information stored within or makes the necessary connections to the database to find structural information and/or data summaries. Depending on the instructions, the SParser 110 may invoke special-purpose code in the servlet. Depending on the results, SParser deletes its own instructions and the test data and may set up one or more macro substitution rules, and then it sends to the web server 200 any data that have been requested in web page format. In the Survey Processing System Implementation, these data may consist of survey, sample or administrative databases, normative data, and structural definitions.

The actual Implementation of the Survey Processing System is based on the content of the html templates and the database structures. The key database table ("Structure") contains fields which describe the name of the data column containing a piece of data, labels for it in various display contexts, details about its origin, such as the question text, its possible range of values, the types of values employed, and the hierarchical structure of that column in the analytic framework.

SParser 110 then continues to read from the HTML template with any modifications due to macro processing, and sends the results to the web server 200. When the page is finished, the web server 200 then sends the produced HTML web page to the Internet user's computer 50 who originated the query, together with the class files from any referenced applets, to the originating browser. The output HTML file together with the applets, are executed by the browser on the user's client computer 50. By clicking on elements of the produced page, the user may initiate another query to the web server, and the process is repeated.

The SParser services include, but are not limited to, (a) storing and translating on input simple phrase substitutions based on query elements, stored phrases, or data vectors; (b) executing SQL queries; (c) managing database connections and result sets to minimize server resource consumption; (d) formatting information from queries useable HTML or Java-Script commands, (e) detecting and classifying errors and providing branching logic if they occur, and (f) deleting test data or other HTML.

The SParser application is the core tool of the invention. It is a computer program that reads hypertext templates and modifies them prior to sending them to the web server for display by the user's (client) browser. There is one template for each type of display in the system, potentially an infinite number depending on the complexity of the system. The operation of use consists of deleting test data used for design purposes and substituting actual survey data summaries. This is accomplished through compact statements containing Structured Query Language (SQL) queries and instructions about how to display the results through hypertext markup language (html) web pages and JAVA applets. The SQL statements are embedded in a specifically-designed macro language. The SParser module 110 also contains facilities for recognizing and validating user queries, substituting content based on stored information, processing errors, and efficiently executing JAVA-written special purpose instructions.

The web server 200, JAVA servlet engine 130, and database server 300 all may be drawn from convenient commercial or freely available choices. The system has been successfully implemented on both a MS Windows® and a Linux platform using the Apache server, JServ JAVA servlet engine, and MySQL database server.

Figure 2:
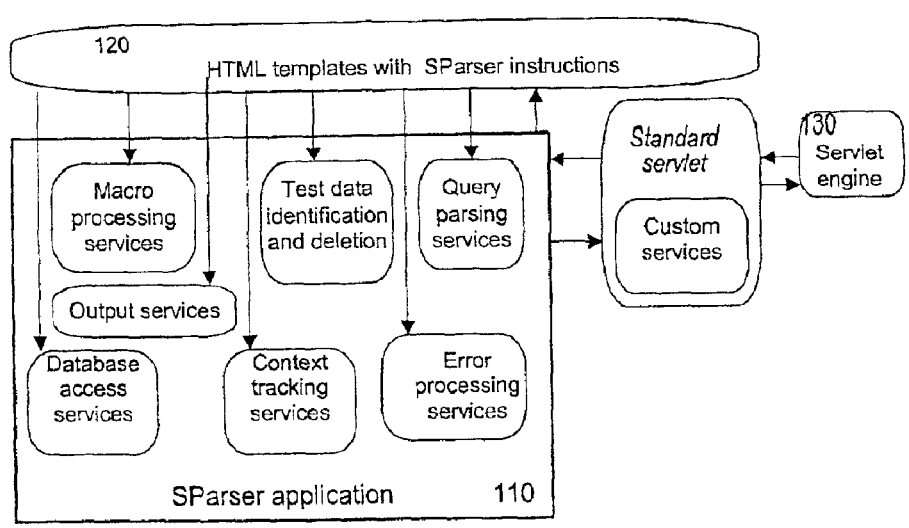
FIG. 2 is a block diagram showing the general design of the SParser application. The arrows show the direction in which requests and data flow in the system.

FIG. 2 shows some more detail on the interaction between the HTML template 120 and SParser 110. SParser 110 reads and interprets the template 120, but the process can be thought of as one in which the HTML template 120 invokes SParser 110 services. Database services include maintaining connections, issuing Structured Query Language statements, and opening and closing result sets. Context maintenance includes remembering phrases or data that describe user privileges, preferences, and analysis conditions—phrases and data tables may be held in memory for later reference. Macro processing includes the ability to define phrase substitutions that apply to the remainder of the HTML template. Test data identification and deletion allows the template to contain test data and yet still function in an operational environment. Query parsing services standardize, interpret, and decode different types of HTML queries, such as GET and POST queries, multiple-parameter queries. Error processing services create error message structures and provide for query redirection if needed. Output services translate data output in ways suitable to HTML and/or JavaScript.

Figure 3:
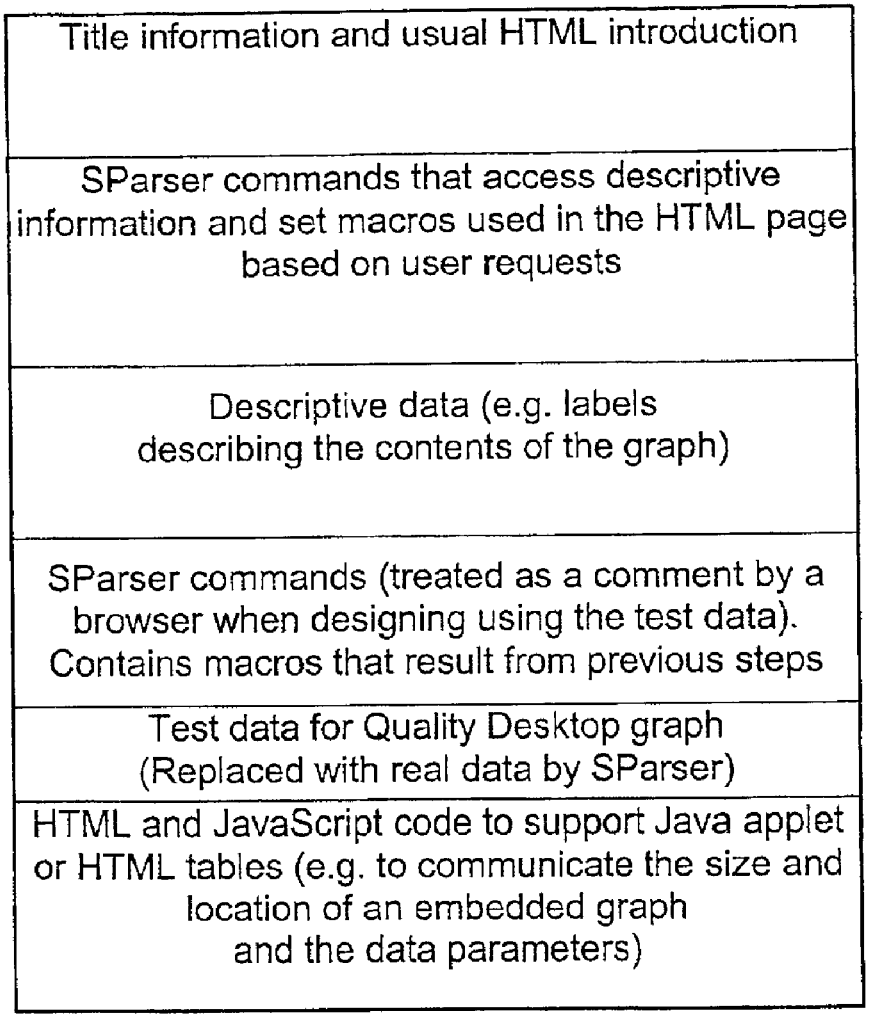
FIG. 3 is a block diagram showing the typical layout of an HTML template.

FIG. 3 describes the appearance of an HTML template in block diagram form. The Title information consists of HTML and JavaScript commonly found at the beginning of pages. For example, there may be commands assuring that the page won't be cached, defining the proper page borders, and setting the background appearance. This is followed by as some SParser commands which are viewed as comments by a browser during a test. The SParser commands locate information in tables required to determine the structure of the request—for example, what value labels to use. This is followed by a test version the descriptive data themselves—replaced with real descriptive data when the page is actually generated. The test data usually are created as JavaScript variables and arrays. The fourth section usually consists of SParser commands that are modified by the previous structure request (using macro substitution, where specific phrases are changed to other phrases). These commands generate actual data (such as the counts of surveys with each of the possible responses to a question. The fifth section contains test numerical data that are substituted for when the template is processed-again, definitions of JavaScript variables and arrays. The sixth and last section contains Java-Script and HTML code to call a JAVA applet or display an HTML table.

When the SParser generates live data, it deletes test data used for design purposes and substitutes actual survey data summaries. Data acquisition is accomplished through compact statements containing Structured Query Language (SQL) queries to the database. SParser templates contain instructions about how to display the results through hyper-text markup language (html) web pages and JAVA applets. The SQL statements are embedded in a specifically-designed macro language that allow an example to represent a family of similar queries. The SParser module also contains facilities for recognizing and validating user queries, substituting content based on stored information, processing errors, and efficiently executing JAVA-written special purpose instructions.

The following is an example of a set of SParser commands:

<@ REQUEST(list)
GMACRO(Grestrict=GlobalRestrictSurveySelectVector)
SQL("SELECT Labels.Dataval AS OrderNo, Labels. Color AS
ColorBar, Count(Data.QQQ) AS Cases, FROM Labels LEFT
JOIN Data ON Labels.Dataval=Data.QQQ WHERE (Grestrict)
GROUP BY Labels.Dataval") ARRAY(OrderNo, ColorBar,Cases)
DISCARD . . . (test data)@>.

The request command defines the type of request. In this case "list" means that the results of the query will be listed out. GMACRO sets a macro for use in all following lines. In the example, the macro Grestrict is set to a variable stored internally as GlobalRestrictSurveySelectVector. Variables like that can be saved in one user request and used later in the session to keep track of sites, genders, or age groups selected. The next line contains a SQL query inside the double quotes. The ARRAY command specifies that SParser is supposed to output the list as JavaScript arrays—in this case 3 arrays named OrderNo, ColorBar, and Cases. QQQ is a macro defined in a previous SParser command sequence containing the column in the Data table that is set in a previous request from the Structure table. Finally, the DISCARD command indicates that all further command input is to be ignored as SParser produces its results. The entire SParser sequence is contained between delimiters <@ and @>. The table below contains further examples of the SParser macro language:

The macro language allows the user to set macros based on query parameters, the results of a query, or from saved context. Once the macro is set, all remaining input from the HTML template is scanned for the macro substitution phrase. If the phrase is observed, the value is substituted. In a typical HTML template, an early sequence of commands is used to obtain metadata, and then the metadata are used to structure the queries for other types of data, as in the example immediately above.

Figure 4:
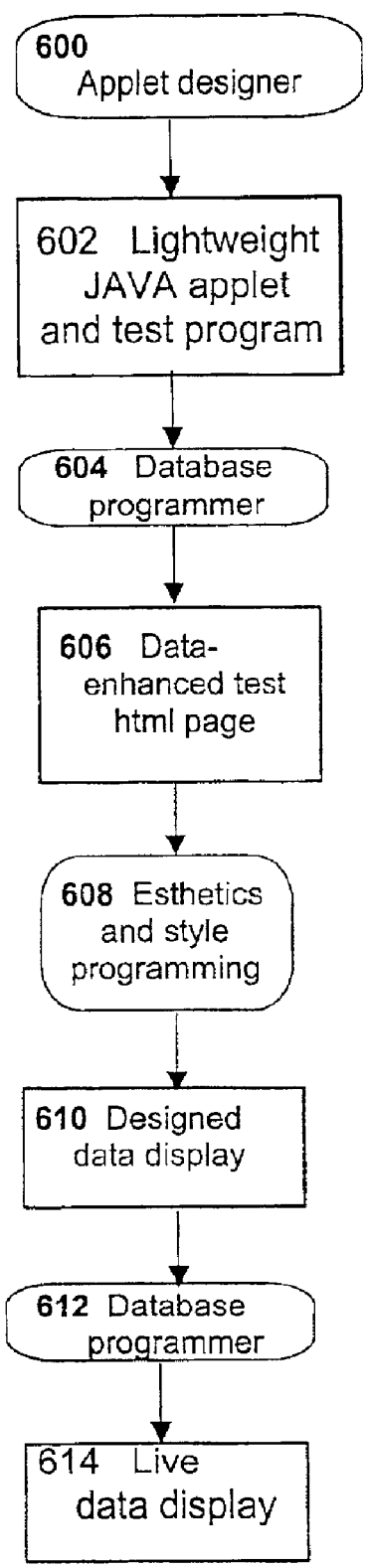
FIG. 4 is a flow diagram showing how HTML templates are developed using the SParser system.

FIG. 4 shows the general HTML template design process according to the invention. The development of an SParser html template moves from one person to another in the design cycle. Each programmer can concentrate on his or her area of expertise without necessarily having to interact with the other programmers. The user interface designer modifies a familiar html document using visual interface tools, instead of having to create the effect by writing code that in turn writes html output-something that is very hard for most html programmers to do, but which would be required by competing systems. This system is efficient to build and maintain because different individuals can perform the role of creating statistical display applets, accessing the database, and styling the display.

Referring to FIG. 4, an Applet designer 600 is a Java Programmer who knows the rules for producing a correct statistical graph or table. Usually, this is a person with an advanced degree and/or advanced experience. A lightweight JAVA applet is a short piece of Java code designed to produce a graph (such as a bar chart) or table for display to a user on a user computer 50, typically using a web browser. The graph should preferably be customizable in terms of the colors of the bars or the display of the vertical and/or horizontal scale lines, but it can be more flexible about where to place labels. The applet must be short to minimize download and initialization times on the client computer, especially for cases where low bandwidth Internet connections are used (such as a standard modem). In this step, the applet designer 600 also produces a test program 602 using test data to demonstrate how the applet might be used. By separating this step from other steps that require less experienced programmers, the development process costs can be reduced and standardized.

A database programmer 602 is a programmer who knows Structured Query Language (SQL), the lingua franka of major databases such as MYSQL®, Oracle®, Microsoft® SQL server, and IBM's DB2®. The database programmer 602 is also familiar with the contents of the databases used by the database server 300. The database programmer 602 understands and adds the SParser instructions necessary to utilized the Java applet using the appropriate data. The database programmer 602 produces a test html page 606, which is an HTML page that combines the test program 602 from the applet designer 600 with an example of data from the database. Apart from the SParser instructions, it is usually a mechanical reformulation of the test code for the applet. The reformulation is needed so that the data are actually passed to the applet. This step is completed when the graph, table, or other display is browsed with the test data (without regard for esthetics).

The esthetics or style programmer 608 is a person who is familiar with designing web sites and formatting web pages. This kind of programmer usually knows little about statistics or databases, but may have extensive artistic training. A visual design program (such as Macromedia's DreamWeaver®) may be used at this step as a design tool. A nearly-finished HTML template is thus produced by the programmer 608. Only a final review by the database programmer 604 is necessary to supply any data that may have been missed previously and to ensure that the SParser commands are correct and operational. The final result is a data display 612 that is created by the process described in FIGS. 1–3 for display on a user computer 50.

The system and method is ultimately easier to use than current technology because the data may be found in the well-organized hierarchical structure. Data are divided into Satisfaction, Functioning, Cost, and Clinical quality/outcome measures, plus personal data such as age, gender, and diagnosis. Satisfaction data are further divided into categories such as Initiating Care, Receiving Care, Discharge and Billing, and Overall Satisfaction. A nurse, doctor, or quality improvement specialist can easily see performance, compared over medical unit, over time, by age or sex, or by any other variable in the system.

The system (in the larger sense) is also easier to maintain since it depends upon database tables rather than hard-coded logic. To implement a new survey, one need only supply a new structure table and the necessary data labels and (if desired) normative information. Indeed, these structure tables can be automatically generated based on survey scripts used in other parts of the applicant's system. In this sense, this application is related to co-pending applications describing the ICS and the POVS, referenced hereinabove.

The invention has been described hereinabove using specific examples; however, it will be understood by those skilled in the art that various alternatives may be used and equivalents may be substituted for elements or steps described herein, without deviating from the scope of the invention. Modifications may be necessary to adapt the invention to a particular situation or to particular needs without departing from the scope of the invention. It is intended that the invention not be limited to the particular implementation described herein, but that the claims be given their broadest interpretation to cover all embodiments, literal or equivalent, covered thereby.

What is claimed is:

1. A system for generating a display presentation on a user computer, comprising the steps of:

means for connecting a user computer to a web server over a network;

means for validating said user computer;

means for accepting web page requests from said user computer;

means for determining if said web page request is for generating said display presentation;

means for executing a servlet corresponding to said web page request if it was determined that said web page request was for generating said display presentation;

means for retrieving an HTML template corresponding to said executed servlet;

means for interpreting said HTML template including:

means for retrieving data from a database according to said servlet execution, said retrieved data including:

survey data and normative data for generating custom display presentations; and descriptive data for labeling said display presentation means for stripping test data from said HTML template;

means for embedding some portion of said retrieved data in said HTML template, wherein some further portion of some portion of said retrieved data replaces said stripped test data;

means for executing commands referenced in said HTML template, said commands for generating a display web page utilizing said retrieved data;

means for serving said display web page to said user computer, said display web page for generating a display presentation including a graphical diagram, a table, or a multi-medial presentation on said user computer.

2. A method for generating a display presentation on a user computer, comprising the steps of:

connecting a user computer to a web server over a network;

validating said user computer;

accepting a web page request from said user computer;

determining if said web page request is for generating said display presentation;

executing a servlet corresponding to said web page request if it was determined that said web page request was for generating said display presentation;

retrieving an HTML template corresponding to said executed servlet;

interpreting said HTML template including the steps of:

retrieving data from a database according to said servlet execution, said retrieved data including:

survey data and normative data for generating custom display presentations; and descriptive data for labeling said display presentation stripping test data from said HTML template;

embedding some portion of said retrieved data in said HTML template, wherein some further portion of some portion of said retrieved data replaces said stripped test data;

executing commands referenced in said HTML template, said commands for generating a display web page utilizing said retrieved data;

serving said display web page to said user computer, said display web page for generating a display presentation including a graphical diagram, a table, or a multi-medial presentation on said user computer.

3. A method for generating a display presentation on a user computer, comprising the steps of:

connecting a user computer to a web server over a network;

accepting a web page request from the user computer;

determining if said web page request is for generating said display presentation;

executing a servlet corresponding to said web page request if it was determined that said web page request was for generating said display presentation;

retrieving an HTML template corresponding to said executed servlet;

interpreting said HTML template including the steps of:

retrieving retrieved data from a database according to said servlet execution, said retrieved data having:

survey data and normative data for generating custom display presentations, and descriptive data for labeling said display presentation;

embedding some portion of said retrieved data in said HTML template; and executing at least one command referenced in said HTML template, said at least one command for generating a display web page utilizing said retrieved data;

serving said display web page to the user computer, said display web page for displaying a display presentation of a previously conducted survey including a graphical diagram, a table, or a multi-medial presentation on the user computer;

serving at least one applet along with said web page to the user computer; and stripping test data from said HTML template, wherein some further portion of some portion of said retrieved data replaces said stripped test data, wherein said displaying said display presentation on the user computer includes the step of executing said applet on the user computer, and wherein said at least one applet is a member of the group consisting of:

graphing applets for generating graphical diagrams;

table producing applets for generating tables; and multimedia applets for generating multimedia presentations; and further wherein said template comprises:

title information;

descriptive data for labeling said display presentation; and

JavaScript code to communicate size and location information to said at least one applet for directing the formatting of said display presentation.

* * * * *